(12) United States Patent
Xie

(10) Patent No.: US 12,120,195 B2
(45) Date of Patent: Oct. 15, 2024

(54) RESOURCE ACQUISITION METHOD, WEBVPN PROXY SERVER, SYSTEM, AND SERVER

(71) Applicant: WANGSU SCIENCE & TECHNOLOGY CO., LTD., Shanghai (CN)

(72) Inventor: Wenwei Xie, Shanghai (CN)

(73) Assignee: WANGSU SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/194,595

(22) Filed: Mar. 31, 2023

(65) Prior Publication Data
US 2023/0239369 A1 Jul. 27, 2023

Related U.S. Application Data

(63) Continuation of application No. PCT/CN2021/124446, filed on Oct. 18, 2021.

(30) Foreign Application Priority Data

May 19, 2021 (CN) .......................... 202110546444.5

(51) Int. Cl.
*G06F 13/00* (2006.01)
*H04L 12/46* (2006.01)
(Continued)

(52) U.S. Cl.
CPC ........ *H04L 67/561* (2022.05); *H04L 12/4641* (2013.01); *H04L 67/563* (2022.05)

(58) Field of Classification Search
CPC .............. H04L 67/561; H04L 12/4641; H04L 67/563; G06F 16/958; G06F 21/6263
(Continued)

(56) References Cited

U.S. PATENT DOCUMENTS 7,660,899 B2 * 2/2010 Gavrilescu ............ G06F 16/954
709/227
9,489,356 B2 * 11/2016 Sheretov ............. H04L 63/0281
(Continued)

FOREIGN PATENT DOCUMENTS

| CN | 104392008 A | 3/2015 |
| CN | 110808897 A | 2/2020 |

(Continued)

OTHER PUBLICATIONS

Wangsu Science & Technology Co., Ltd., International Search Report with English translation, PCT/CN2021/124446, Feb. 15, 2022, 6 pgs.

Primary Examiner — Kenneth R Coulter
(74) Attorney, Agent, or Firm — USCH Law, PC

(57) ABSTRACT

Embodiments of the present disclosure relate to the field of communication technology, and disclose a resource acquisition method, including: receiving a user input event from a first browser on a client; acquiring an event result triggered at a second browser by the user input event, where the second browser runs on the server for the WebVPN; acquiring, using the second browser, resources from a source station according to the event result; and feeding back the resources to the client, to present the resources at the first browser. Embodiments of the present disclosure further disclose a proxy server for a WebVPN, a resource acquisition system, and a server.

17 Claims, 5 Drawing Sheets

(51) Int. Cl.
*H04L 67/561* (2022.01)
*H04L 67/563* (2022.01)

(58) Field of Classification Search
USPC .................. 709/203, 217–219, 231, 202
See application file for complete search history.

(56) References Cited

U.S. PATENT DOCUMENTS

| | | | |
|---|---|---|---|
| 10,798,127 B2 * | 10/2020 | Sheretov | G06F 16/954 |
| 2005/0091572 A1 * | 4/2005 | Gavrilescu | G06F 16/954 |
| | | | 715/252 |
| 2014/0129920 A1 | 5/2014 | Sheretov et al. | |
| 2017/0093925 A1 * | 3/2017 | Sheretov | H04L 63/0281 |

FOREIGN PATENT DOCUMENTS

| | | |
|---|---|---|
| CN | 110855766 A | 2/2020 |
| CN | 112104703 A | 12/2020 |
| CN | 112272158 A | 1/2021 |
| CN | 113204730 A | 8/2021 |
| WO | 2014161455 A1 | 10/2014 |

\* cited by examiner

RESOURCE ACQUISITION METHOD, WEBVPN PROXY SERVER, SYSTEM, AND SERVER

CROSS REFERENCE TO RELATED APPLICATIONS

The present application is a continuation of PCT Patent Application No. PCT/CN2021/124446, entitled "RESOURCE ACQUISITION METHOD AND SYSTEM, WEBVPN PROXY SERVER AND SERVER," filed Oct. 18, 2021, which claims priority to Chinese Patent Application No. 202110546444.5, entitled "RESOURCE ACQUISITION METHOD, WEBVPN PROXY SERVER, SYSTEM, AND SERVER," filed May 19, 2021, each of which is incorporated by reference herein in its entirety.

TECHNICAL FIELD

The present disclosure relates to the field of communication technology, and in particular to a resource acquisition method, a proxy server for a WebVPN, a system and a server.

BACKGROUND

A web virtual private network (WebVPN) is implemented by mapping and rewriting a domain name of a source station into a proxy domain name, to route web traffic to a proxy node in the network, thereby achieving proxy function. However, page content fed back by the source station is always changing, and at least the following situations exist in the implementation:

On one hand, a domain name for a resource link in the page fed back by the source station is determined based on JavaScript splicing.

On the other hand, a station has a service logic including checking of the domain names in the page.

With the above-mentioned situations, mapping and rewriting of the domain name for the resource link in the page fed back by the source station may fail or partially fail, resulting in that access fails to be routed to the proxy node. The access requests which fail to be routed to the proxy node cannot be received by a WebVPN server or arrive at an intranet, therefore no response can be obtained, which not only affects user experience but also may risk exposure of intranet information.

SUMMARY

Embodiments of the present disclosure aim to provide a resource acquisition method, a proxy server for a WebVPN, a system and a server, which enable an access request from a client to be received by a server for a WebVPN, arrive at an intranet, and be normally responded, without need of rewritten of a domain name for a resource link in a page fed back by a source station. In this way, user experience can be improved and risks of exposing intranet information can be prevented.

Some embodiments of the present disclosure provide a resource acquisition method, applicable to a proxy service running on a server for a WebVPN, including: receiving a user input event from a first browser on a client; acquiring an event result triggered at a second browser by the user input event, where the second browser runs on the server for the WebVPN; acquiring, using the second browser, resources from a source station according to the event result; and feeding back the resources to the client, to present the resources at the first browser.

Some embodiments of the present disclosure provide a proxy server for a WebVPN, a proxy service and a browser run on the proxy server, and the proxy service is configured to acquire resources from a source station and feed back the resources to a client based on the method as illustrated above.

Some embodiments of the present disclosure provide a resource acquisition system, including at least one client, at least one source station deployed in an intranet and the proxy server for the WebVPN as illustrated above. The proxy server is configured to receive a user input event from a browser on the at least one client, acquire the resources from the source station based on the user input event and respond to the user input event.

Some embodiments of the present disclosure provide a server, including: at least one processor; and a memory being in communication connection with the at least one processor. The memory is configured to store instructions, which, when executed by the at least one processor, causes the at least one process to implement operations of the resource acquisition method as illustrated above.

In the embodiments of the present disclosure, a user input event from a first browser on a client is received, an event result triggered at a second browser running on the server for the WebVPN by the user input event is acquired, and the second browser acquires resources from a source station according to the event result, and the resources are fed back to the first browser to present the resources. Because the user input event from the first browser triggers an access request, the server for the WebVPN can indirectly obtain the corresponding access request from the client by receiving the user input event and mapping the user input event to the second browser, and acquire, using the second browser, the resources requested by the access request from the source station, thereby achieving a proxy process. In view of this, the resource acquisition method according to the present disclosure is free of feeding back a page having a rewritten domain name to the client, and can prevent abnormal proxy due to incomplete rewriting of domain name. In this way, user experience can be improved and risks of exposing intranet information can be prevented. Moreover, the resources from the source station are only presented at the second browser running on the server for the WebVPN, rather than being directly fed back to the client. In this way, attacks such as script injection and rewriting or typical cross site scripting (XSS) attacks cannot affect intranet sites (e.g. the source station).

In some embodiments, feeding back the resources to the client includes: acquiring a view of a web page resulted from loading the resources at the second browser; generating HTML text according to the view of the web page, and adding a monitoring script configured to monitor the user input event to the HTML text; and feeding back the HTML text to the client, to present the HTML text and run the monitoring script at the first browser. The user input event occurred at the first browser can be effectively monitored by adding the monitoring script configured to monitor the user input event to the HTML text fed back to the client and running the monitoring script at the first browser.

In some embodiments, acquiring the view of the web page resulted from loading the resources at the second browser includes: taking a screenshot of an image of the web page presented at the second browser as the view of the web page after loading and rendering of the resources at the second browser. By taking the screenshot of the image of the web page presented at the second browser as the view of the web page, and generating the HTML text fed back to the first browser according to the screenshot, the user can view the content of the web page fed back by the source station through the first browser, and the first browser would not be triggered, by the user input event at the first browser, to perform corresponding event result, namely sending a corresponding access request.

In some embodiments, acquiring, using the second browser, the resources from the source station according to the event result includes: in response to the event result being page jumping, acquiring an address of a new page to be accessed from an access request sent by the second browser to the new page, replacing a domain name of the source station in the address of the new page with a proxy domain name directing to the server for the WebVPN to obtain a replaced address of the new page, and generating a page jumping request based on the replaced address of the new page; sending the page jumping request to the first browser; receiving an access request sent by the first browser in response to the page jumping request; replacing the proxy domain name in the access request sent by the first browser with the domain name of the source station; and acquiring, using the second browser, the resources from the source station directed to by the domain name of the source station. In response to the event result being page jumping, the domain name of the source station in the address of the new page in the access request sent by the second browser to the new page is replaced with the proxy domain name directing to the server for the WebVPN, to generate the page jumping request. The generated page jumping request is sent to the first browser on the client, so that the first browser sends the access request to the server for the WebVPN in response to the page jumping request, and the second browser acquires the resources. In this way, a corresponding page jumping at the first browser can be achieved. Moreover, because the first browser sends the access request to the server for the WebVPN in response to the page jumping request including the address of the page to be jumped to, the user of the first browser can perceive change in the domain name in the access address. In this way, the browser functions of the first browser can be ensured.

In some embodiments, replacing the domain name of the source station in the address of the new page with the proxy domain name directing to the server for the WebVPN includes: assigning the proxy domain name corresponding to the server for the WebVPN to the domain name of the source station in the address of the new page, and recording a mapping relationship between the domain name of the source station and the proxy domain name; and replacing the domain name of the source station in the address of the new page with the proxy domain name. Replacing the proxy domain name in the access request sent by the first browser with the domain name of the source station includes: replacing, according to the mapping relationship, the proxy domain name in the access request sent by the first browser with the domain name of the source station. During generation of the page jumping request, the proxy domain name corresponding to the server for the WebVPN is assigned to the domain name of the source station, and the mapping relationship between the domain name of the source station and the proxy domain name is recorded, thereby feeding back the page jumping request including the replaced proxy domain name to the first browser. In this way, the first browser can change an address in address bar into the address of the page to be jumped to, and the user of the first browser can perceive the change in the addresses of the pages. Moreover, because the domain name in the page jumping request directs to the server for the WebVPN, the access request sent by the first browser in response to the page jumping request can be received by the server for the WebVPN. Furthermore, record of the mapping relationship may be configured for the server for the WebVPN to automatically study correspondence relationship between the domain name of the source station and the proxy domain name, in this way, the server for the WebVPN can achieve proxy between the client and the source station.

In some embodiments, during recording the mapping relationship between the domain name of the source station and the proxy domain name, a validity duration is set for the mapping relationship; and in response to expiration of the validity duration, the mapping relationship is marked as invalid or is deleted. By setting a validity duration for the mapping relationship, and marking the mapping relationship as invalid or deleting the mapping relationship when the validity duration expires, user accesses can be effectively managed by setting appropriate validity duration, and the risk of exposure of intranet information can be reduced.

In some embodiments, before replacing, according to the mapping relationship, the proxy domain name in the access request sent by the first browser with the domain name of the source station, the method further includes: verifying validity of the access request sent by the first browser based on the mapping relationship and the validity duration; in response to the mapping relationship corresponding to the proxy domain name existing and being valid, determining that the access request sent by the first browser is valid; or in response to the mapping relationship corresponding to the proxy domain name not existing or being invalid, determining that the access request sent by the first browser is invalid, and refusing the access request sent by the first browser.

BRIEF DESCRIPTION OF THE DRAWINGS

One or more embodiments are exemplarily illustrated in reference to corresponding accompanying drawing(s), and these exemplary illustrations do not constitute limitations on the embodiments.

DETAILED DESCRIPTION OF THE EMBODIMENTS

In order to make the objective, the technical solutions and the advantages of the present disclosure more clear, the embodiments of the present disclosure will be further described in details with reference to the accompany drawings. Those skilled in the art should understand that, in the embodiments of the present disclosure, many technical details are provided for the reader to better understand the present disclosure. However, even without these technical details and various modifications and variants based on the following embodiments, the technical solutions claimed in the present disclosure can be realized.

Some embodiments of the present disclosure related to a resource acquisition method. The method includes: an event result triggered, by a user input event, at a second browser running on a server for a WebVPN is acquired by receiving the user input event from a first browser running on a client, and the second browser acquires resources from a source station according to the event result and feeds back the resources to the first browser for presenting. Because the user input event from the first browser aims to trigger generation of a new access request, the server for the WebVPN may obtain a corresponding access request from the client by receiving the user input event and executing the user input event using the second browser, thereby acquiring response resources from a source station as a destination for the access request. In this way, no rewriting of the domain name in a response resource page from the source station is needed in the whole process, thus abnormal proxy or exposure of information due to incomplete rewriting can be completely prevented, thereby improving user experience and safety of the source station in the intranet.

It is noted that the resource acquisition method according to the embodiments of the present disclosure is applicable to a proxy service running on the server for the WebVPN, in other words, the execution subject of the method is the proxy service running on the server for the WebVPN. The proxy service may be, but not limited to, an application running on the server for the WebVPN, and the server for the WebVPN may be implemented by a single server or a cluster consisted of a plurality of servers.

Figure 1:
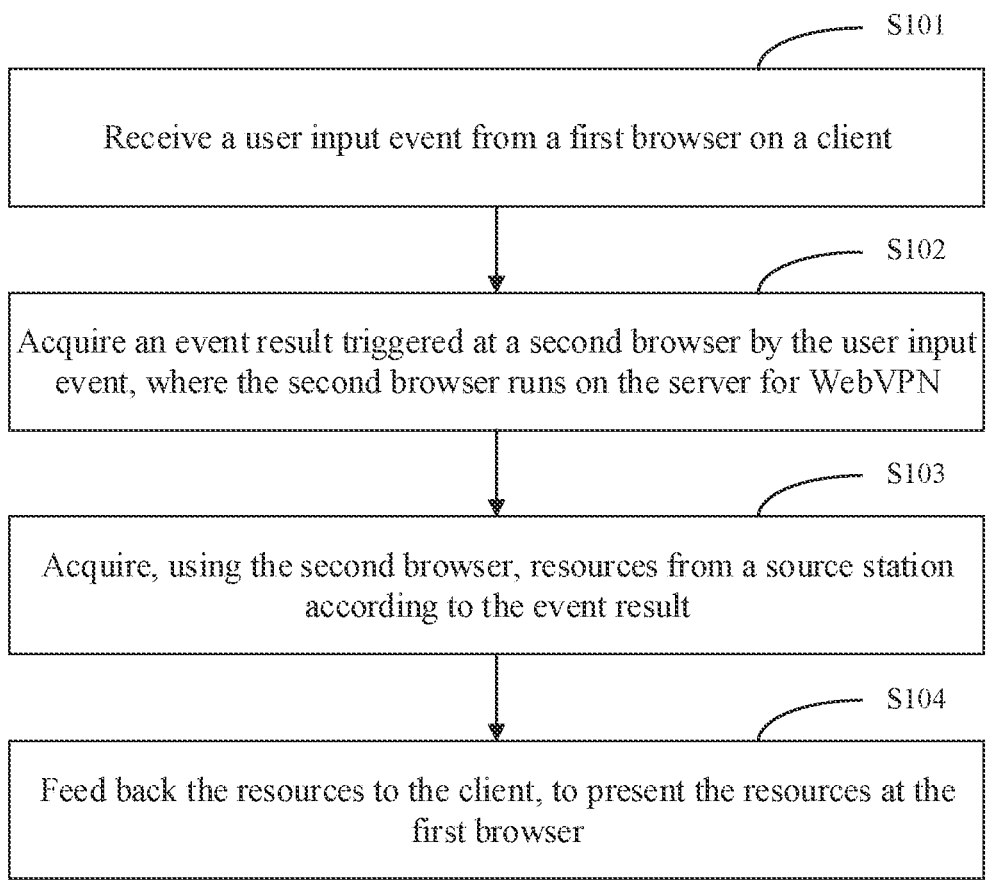
FIG. 1 is a flowchart of a resource acquisition method according to some embodiments of the present disclosure.

The flow of the resource acquisition method provided by the embodiments of the present disclosure is shown in FIG. 1, the method includes the following operations.

At S101, a user input event is received from a first browser on a client.

The user input event refers to an event input by a user using an input device of the client, and the input device may be a mouse, a keyboard, a touch screen or the like. For example, the user may move or click, using the mouse, on the content presented at the first browser. The user input event from the first browser on the client may include two types of user input events, one type of user input event refers to that the user accesses a specified address through the first browser, where the specified address directs to the server for the WebVPN; and the other type of user input event refers to the corresponding operations input by the user based on the resources fed back by the server for the WebVPN and presented at the first browser.

In some embodiments, when an access link is available to the user, the user may access the server for the WebVPN by inputting corresponding address in the address bar of the first browser. For example, the user may request to access to intranet resources through a virtual private network (VPN) by inputting an address of a login page of the server for the WebVPN in the first browser on the client, to send a login request to the WebVPN. The requested domain name in the login request directs to the server for the WebVPN. In view of this, the server for the WebVPN can receive the user input event from the first browser on the client.

In some embodiments, the first browser may load and render the resources after receiving the resources fed back by the server for the WebVPN, and may present the rendered resources to the user. The user may operate based on the presented content to generate the user input event. The user input event may be sent to the server for the WebVPN with the aid of a monitoring script running on the first browser. For example, in response to receiving the login request from the user, the server for the WebVPN may authenticate the user, and may feed back an index page for accessible intranet applications to the client after the authentication passes. Generally, the index page comes from an authentication server and includes links for intranet resources accessible to the user. The links are real links for intranet resources and include real domain names for the intranet applications. The process that the server for the WebVPN feeds back the index page to the client based on the login request may include: a proxy domain name in the login request is replaced with a corresponding domain name of the source station (the authentication server) to obtain a converted login request; response resources (index page data) are acquired, by the local second browser, from the authentication server directed to by the domain name of the source station according to the converted login request; a view of a web page (index page) resulted from loading the response resources at the second browser is acquired; response content for the login request is built according to the view of the web page; and the response content is fed back to the client, to present the view of the web page at the first browser.

It is noted that the response content includes image information corresponding to the view of the web page, and the monitoring script. During loading and rendering of the response content by the first browser, an image corresponding to the view of the web page is presented, and the monitoring script is run concurrently. In this way, input operations from the user based on the image presented at the first browser can be acquired using the monitoring script, and the user input event can be sent to the server for the WebVPN.

At S102, an event result triggered, by the user input event, at the second browser running on the server for the WebVPN is acquired.

At S103, the second browser acquires resources from the source station according to the event result.

After receiving the user input event from the first browser, the user input event may be triggered by the server for the WebVPN at the second browser, to acquire the event result triggered, by the user input event, at the second browser, and resources are acquired from the source station using the second browser according to the event result.

In some embodiments, the user input event may refer to an access request sent by the user through the first browser. The requested domain name in the access request directs to the server for the WebVPN. The server for the WebVPN may replace the proxy domain name with a corresponding domain name of the source station to obtain a converted access request, and may acquire, using the second browser, resources from the source station directed to by the domain name of the source station according to the converted access request.

In some embodiments, the user input event may include coordinates of input points, as well as input methods, such as clicking, double clicking, and the like. After receiving the user input event, the server for the WebVPN may map the user input event into the view of the web page presented at the second browser according to the coordinates of input points and input methods, to acquire responses of the second browser to the user input event, thereby acquiring the event result.

For example, the user input event at the first browser is a click on an A icon in a web page. The server for the WebVPN may map this user input event into the click on the A icon in a web page at the second browser. In response to receiving the click operation, the second browser may automatically respond, i.e. generate a corresponding event result. The event result may include a page jumping request, in other words, the event result is a request for jumping to a new page sent to the corresponding source station.

Figure 2:
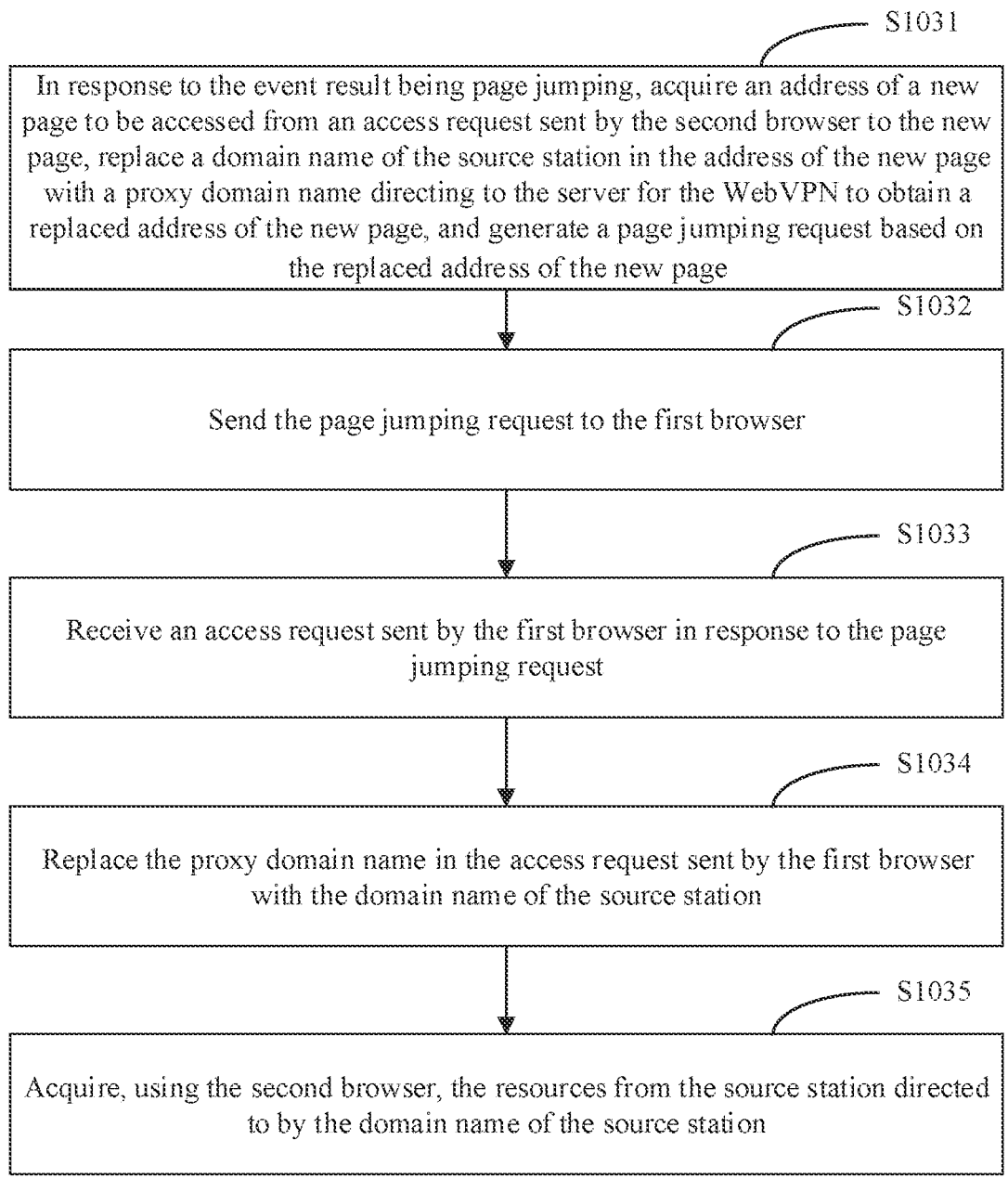
FIG. 2 is a flowchart of the operation S103 of the resource acquisition method according to some embodiments of the present disclosure.

In some embodiments, as shown in FIG. 2, the operation S103 (i.e. acquiring, using the second browser, resources from the source station according to the event result) may include the following operations.

At S1031, in response to the event result being page jumping, an address of a new page to be accessed is acquired from an access request sent by the second browser to the new page, the domain name of the source station in the address of the new page is replaced with a proxy domain name directing to the server for the WebVPN to obtain a replaced address of the new page, and a page jumping request is generated based on the replaced address of the new page.

At S1032, the page jumping request is sent to the first browser.

At S1033, an access request sent by the first browser in response to the page jumping request is received.

At S1034, the proxy domain name in the access request sent by the first browser is replaced with the domain name of the source station.

At S1035, the second browser acquires the resources from the source station directed to by the domain name of the source station.

In some embodiment, when the event result is page jumping, it indicates that the user wants to access an address of a new page, in other words, the first browser is required to send an access request for the address of the new page. In this case, the server for the WebVPN may intercept an access request for the new page sent by the second browser based on the user input event, acquire the address of the new page to be accessed from the access request for the new page, replace the domain name of the source station in the address of the new page with a proxy domain name directing to the server for the WebVPN to obtain a replaced address of the new page, generate a page jumping request based on the replaced address of the new page, and send the page jumping request to the first browser on the client. In response to receiving the page jumping request, the first browser sends an access request for the replaced address of the new page. The page jumping request may be implemented based on a 302 jumping request.

As an example, an original domain name is "http:// www.XXX.com", the user input event is that the user clicks on an icon "news" with the mouse, and the event result is that the page is going to jump to "http://news.XXX.com", i.e., it is triggered, at the second browser, to send a page access request to "http://news.XXX.com". In this case, the server for the WebVPN may intercept the page access request sent by the second browser, acquire an address of a page to be accessed, i.e. "http://news.XXX.com", from the page access request, replace the domain name of the source station "news.XXX" in the address with the proxy domain name "news.XXX-002.proxy" directing to the server for the WebVPN, generate a 302 request based on the replaced address of the page "http://news.XXX-002.proxy.com", and send the 302 request to the first browser, such that the first browser sends an access request to the new address of the page "http://news.XXX-002.proxy.com".

In some embodiments, after receiving the access request, the server for the WebVPN may replace a requested domain name in the access request with a corresponding domain name of the source station, and send the converted access request through the second browser, to acquire response resources from the source station directed to by the domain name of the source station.

In embodiments of the present disclosure, a method of acquiring the proxy domain name corresponding to the domain name of the source station by the server for the WebVPN include: calculating, based on a random algorithm, an encryption algorithm or the like, a unique identifier corresponding to the domain name of the source station. For example, an identifier P1 corresponding to a domain name of a source station "news.A.com" is obtained by calculation, and a proxy domain name "P1.vpn.com" is obtained by combining this identifier with a preset proxy flag. The proxy flag is preset and in a form of a superior-level domain name when combining with the identifier to obtain the proxy domain name. In this way, it can be ensured that extensive domain names of the proxy domain names generated based on the domain name of the source station are all the same, and the generated proxy domain names direct to the server for the WebVPN. Based on this, these proxy domain names can be parsed to the server for the WebVPN by configuring DNS parsing rules. After acquiring the proxy domain names corresponding to the domain name of the source station, the server for the WebVPN may build respective mapping relationship between the domain name of the source station and each of the proxy domain names, and store the mapping relationships at local. In response to receiving an access request from the first browser, a proxy domain name in the access request may be restored into the corresponding domain name of the source station based on the stored mapping relationships.

In some embodiments, during recording the mapping relationship between the domain name of the source station and the proxy domain name, the server for the WebVPN may set a validity duration for the mapping relationship. In response to expiration of the validity duration, the mapping relationship is marked as invalid or is deleted. Accordingly, before replacing, according to the mapping relationship stored locally, the proxy domain name in the access request sent by the first browser with the domain name of the source station, the method further includes: verifying validity of the access request sent by the first browser based on the mapping relationship and the validity duration; in response to the mapping relationship corresponding to the proxy domain name existing and being valid, determining that the access request sent by the first browser is valid; or in response to the mapping relationship corresponding to the proxy domain name not existing or being invalid, determining that the access request sent by the first browser is invalid, and refusing the access request sent by the first browser. In this way, access safety can be improved.

At S104, the resources are fed back to the client, to present the resources at the first browser.

Figure 3:
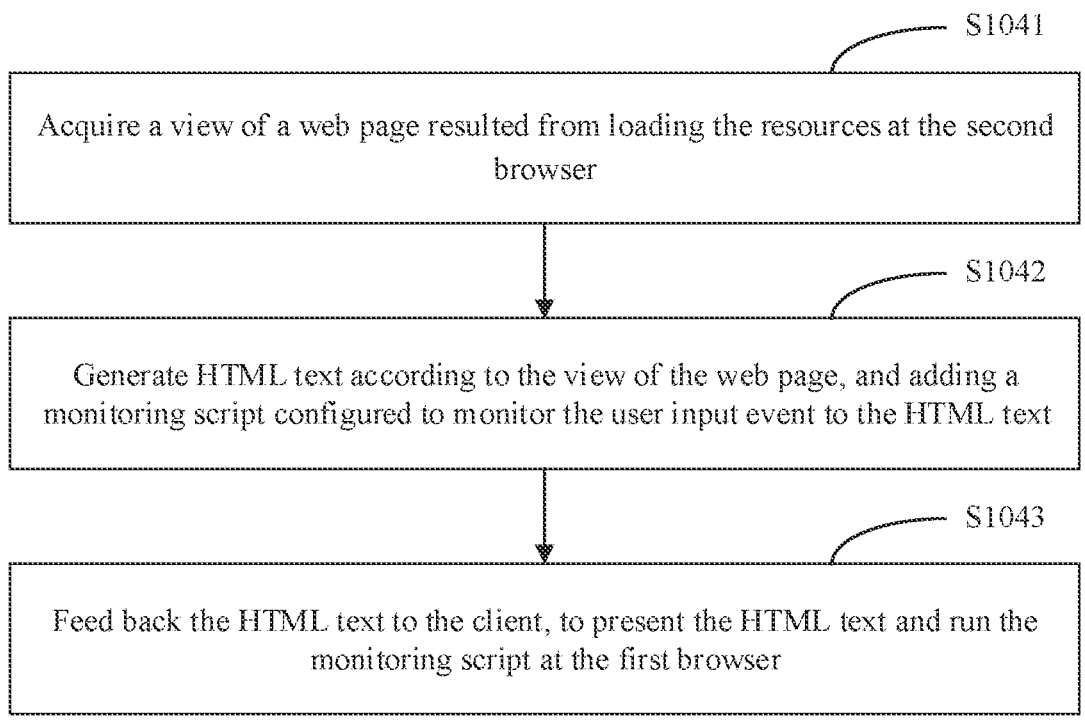
FIG. 3 is a flowchart of the operation S104 of the resource acquisition method according to some embodiments of the present disclosure.

In some embodiments, as shown in FIG. 3, the operation S104 (i.e., feeding back the resources to the client, to present the resources at the first browser) may include the following operations.

At S1041, a view of a web page resulted from loading the resources at the second browser is acquired.

At S1042, HTML text is generated according to the view of the web page, and a monitoring script configured to monitor the user input event is added to the HTML text.

At S1043, the HTML text is fed back to the client, to present the HTML text and run the monitoring script at the first browser.

In some embodiments, the user input event occurred at the first browser can be effectively monitored by adding the monitoring script configured to monitor the user input event to the HTML text fed back to the client and running the monitoring script at the first browser. Exemplarily, after running the monitoring script, a persistent connection based on websocket may be established between the first browser and the server for the WebVPN. When a user input event occurs, the event may be converted into corresponding format data, for example "position x: 120, y:130, mouse move", and be sent. Content of the user input event may be sent to the server for the WebVPN, and the server for the WebVPN may generate operations of the second browser based on the content.

In some embodiments, the operation S1041 includes: taking a screenshot of an image of the web page presented at the second browser as the view of the web page after loading and rendering of the resources at the second browser.

In some embodiments, by taking the screenshot of the image of the web page presented at the second browser as the view of the web page, and then generating the HTML text fed back to the first browser according to the screenshot, the user can view the content of the corresponding web page, and the user input event input by the user at the first browser would not be trigger corresponding event result.

It is noted that during loading of the resources at the second browser, sub-resources, such as js, css and the like, in the resources would be loaded at the second browser according to page syntax. While the first browser presents the view of the web page in a form of image, rather than resource information fed back by the source station. In other words, the first browser on the client at user end cannot acquire resource information from the intranet. Therefore, there is no risk of exposure of intranet information due to feeding back the resource information from the intranet to the client.

In the resource acquisition method provided by the embodiments of the present disclosure, the user input event from the first browser on the client is received, the event result triggered at the second browser running on the server for the WebVPN by the user input event is acquired, and the second browser acquires resources from the source station according to the event result, and feeds back the resources to the first browser to present the resources. Because it is not necessary to feed back data of web page including links for intranet resources to the user, there is no need of perform domain name rewriting on the information fed back to the user. In this way, not only abnormal proxy due to incomplete rewriting of domain name can be prevented, but also safety of resource information from the intranet can be secured, and risks of exposing intranet information can be prevented.

It should be noted that in some other embodiments of the present disclosure, the event result may be of other types. In one embodiment, after the operation S102 (i.e., acquiring the event result triggered at the second browser by the user input event), the method may further include: in response to the event result being directing to an input box, a text input box is generated in the first browser according to a position of the user input event to receive text content input by the user through the client, and then the second browser requests resources from the source station according to the text content.

As an example, when the user moves a cursor, using a mouse, to an input box in a view of a web page presented at the first browser, it is monitored, by the server for the WebVPN, that the event result is directing to the input box, then a text input box is generated in the first browser according to a position of the cursor to receive text content input by the user, and the server for the WebVPN requests resources from the source station according to the text content input by the user and feeds back the resources to the first browser.

The method as illustrated above is divided into operations only for the sake of clarity. When implemented, these operations may be combined into one operation or some of the operations may be further split into a plurality of operations, as long as containing the same logical relationship, these operations are all within the scope of protection of the present disclosure. Adding unimportant modifications or designs to algorithms or processes without changing the core designs of the algorithms and processes is within the scope of protection of the present disclosure.

Figure 4:
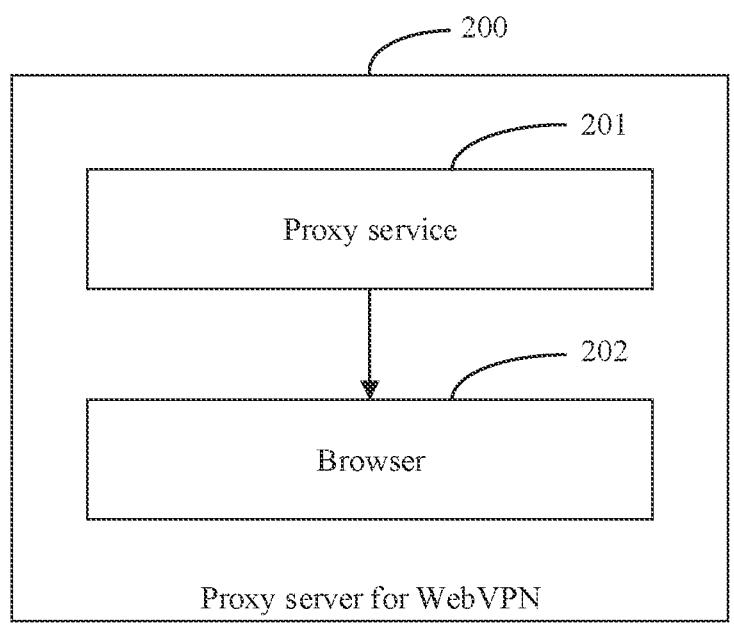
FIG. 4 is a structural schematic diagram of a proxy server for a WebVPN according to some embodiments of the present disclosure.

Some embodiments of the present disclosure related to a proxy server 200 for a WebVPN, as shown in FIG. 4, including: a proxy service 201 and a browser 202 running on the proxy server 200 for the WebVPN. The proxy service is configured to acquire resources from a source station and feed back the resources to a client based on the resource acquisition method provided by the embodiments as illustrated above.

Figure 5:
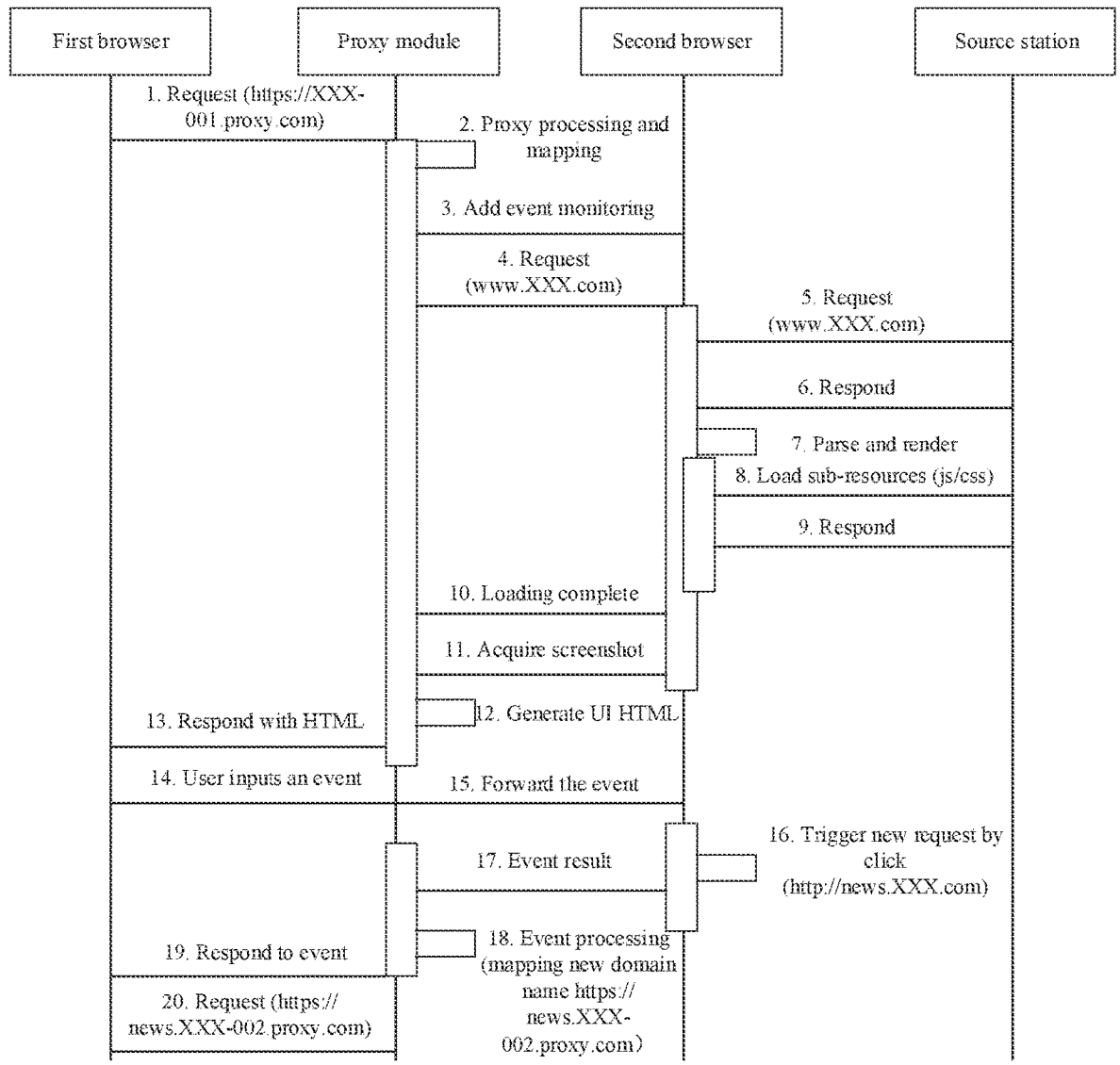
FIG. 5 is a timing sequence diagram of acquisition of resources by the proxy server for the WebVPN according to some embodiments of the present disclosure.

FIG. 5 shows a process of acquiring resources by the proxy server 200 for the WebVPN. In FIG. 5, the proxy module refers to the proxy service 201, and the second browser refers to the browser 202. The timing process is as follows.

The first browser on the client sends an access request to the proxy module, and an address to be accessed is: https://XXX-001.proxy.com.

The proxy module replaces, based on a mapping relationship stored locally, a requested domain name (i.e., a proxy domain name) XXX-001.proxy in https://XXX-001.proxy.com with a corresponding domain name of a source station www.XXX, to obtain a replaced address to be accessed http://www.XXX.com, and replaces the address to be accessed in the access request with http://www.XXX.com.

The proxy module is configured to monitor whether the second browser has completed loading.

The proxy module requests to access http://www.XXX.com through the second browser.

The second browser accesses the source station corresponding to www.XXX according to http://www.XXX.com.

The source station responds resources to the second browser.

The second browser parses and renders the resources acquired from the source station.

The second browser sends a request for loading sub-resources, such as js, css and the like, to the source station.

The source station responds resources including js and css to the second browser.

The proxy module monitors that the second browser has completed loading.

The proxy module takes a screenshot of an image of the web page presented at the second browser.

The proxy module generates HTML text (UI HTML) for the first browser according to the screenshot.

The proxy module responds the generated HTML text to the first browser and references some js resources in response content, to achieve monitoring of the user input event at the first browser.

The proxy module receives the monitored user input event.

The proxy module forwards the user input event to the second browser.

A new request for http://news.XXX.com is triggered at the second browser by click.

The proxy module acquires a triggered event result.

The proxy module processes the event, and maps http://news.XXX.com to https://news.XXX-002.proxy.com, to achieve mapping to the proxy domain name.

A result of event processing, i.e. https://news.XXX-002.proxy.com, is sent to the first browser as response.

The first browser sends a new request for https://news.XXX-002.proxy.com, and then the process returns to the first operation in the flow.

It can be seen that the embodiments of the proxy server for the WebVPN are in correspondence to those of the resource acquisition method, and these embodiments may be implemented in cooperation. The technical details provided by the embodiments of the resource acquisition method are applicable to those of the proxy server for the WebVPN, and will not be repeated to avoid redundancy. Accordingly, the technical details provided by the embodiments of the proxy server for the WebVPN are also applicable to those of the resource acquisition method.

It is noted that the modules in embodiments of the present disclosure are logical modules. In practice, a logical unit may be a physical unit, a part of a physical unit, or a combination of a plurality of physical units. Moreover, for the purpose of highlighting the inventive part of the present disclosure, units that are not closely related to solving the technical problems raised in the present disclosure are not mentioned, but this does not indicate that there are no other units in embodiments of the present disclosure.

Figure 6:
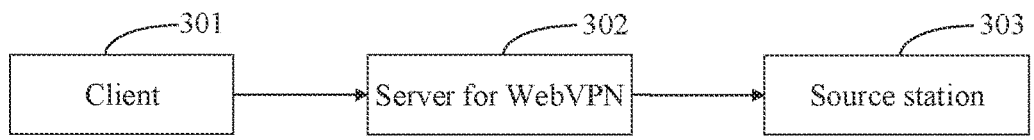
FIG. 6 is a structural schematic diagram of a resource acquisition system according to some embodiments of the present disclosure.

Some embodiments of the present disclosure related to a resource acquisition system, as shown in FIG. 6, including a client 301, the proxy server 302 for the WebVPN as illustrated above and a source station 303 deployed in an intranet. The proxy server 302 for the WebVPN is configured to receive a user input event from a browser on the client 301, acquire the resources from the source station 303 based on the user input event and respond to the user input event.

It can be seen that the embodiments of the resource acquisition system are in correspondence to those of the resource acquisition method and of the proxy server for the WebVPN, and these embodiments may be implemented in cooperation. The technical details provided by the embodiments of the resource acquisition method and of the proxy server for the WebVPN are applicable to those of the resource acquisition system, and will not be repeated to avoid redundancy. Accordingly, the technical details provided by the embodiments of the resource acquisition system are also applicable to those of the resource acquisition method and of the proxy server for the WebVPN.

Figure 7:
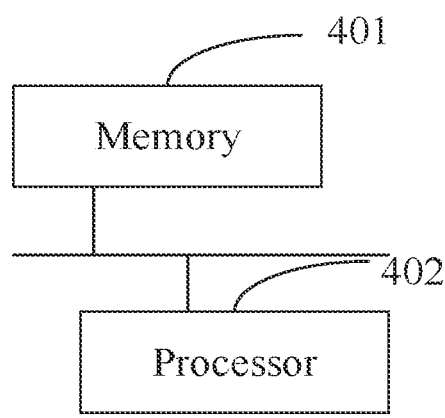
FIG. 7 is a structural schematic diagram of a server according to some embodiments of the present disclosure.

Some embodiments of the present disclosure related to a server, as shown in FIG. 7, including at least one processor 401 and a memory 402 being in communication connection with the at least one processor 401. The memory 402 is configured to store instructions, which, when executed by the at least one processor 401, causes the at least one process 401 to implement operations of the resource acquisition method as illustrated above.

The memory 402 and the at least one processor 401 are connected by a bus which may include random number of interconnected buses and bridges, and the bus connects various circuits of the memory 402 and of the at least one processor 401 to each other. The bus may also connect various other circuits, such as peripheral devices, voltage regulators and power management circuits, to each other, which are well known in the art. Therefore, the present disclosure will not further illustrate. Bus interface provides the interface between the bus and transceiver. The transceiver may include one device or multiple devices, such as a plurality of receivers and transmitters, to provide a unit for communicating with various other devices on the transmission medium. The data processed by the at least one processor 401 is transmitted on the wireless medium through the antenna. Further, the antenna also receives data and transmits the data to the at least one processor 401.

The at least one processor 401 is responsible for bus management and general processing, and may provide various functions, including timing, peripheral interface, voltage regulation, power management and other control functions. The memory 402 may be configured to store the data used by the at least one processor 401 when executing the instructions.

Those having ordinary skill in the art shall understand that the above embodiments are exemplary implementations for realizing the present disclosure. In practice, modifications may be made in forms and details without departing from the scope of the present disclosure.

What is claimed is:

1. A resource acquisition method, applicable to a proxy service running on a server for a web virtual private network (WebVPN), comprising:
   receiving a user input event from a first browser on a client;
   acquiring an event result triggered at a second browser by the user input event, wherein the second browser runs on the server for the Web VPN;
   acquiring, using the second browser, resources from a source station according to the event result, and taking a screenshot of an image of a web page presented at the second browser as a view of the web page after loading and rendering of the resources at the second browser; and
   feeding back the resources to the client based on the view of the web page, to present the resources at the first browser.

2. The resource acquisition method according to claim 1, wherein feeding back the resources to the client based on the view of the web page, comprises:
   generating HTML text according to the view of the web page, and adding a monitoring script configured to monitor the user input event to the HTML text; and
   feeding back the HTML text to the client, to present the HTML text and run the monitoring script at the first browser.

3. The resource acquisition method according to claim 1, wherein acquiring, using the second browser, the resources from the source station according to the event result comprises:
   in response to the event result being page jumping, acquiring an address of a new page to be accessed from an access request sent by the second browser to the new page, replacing a domain name of the source station in the address of the new page with a proxy domain name directing to the server for the WebVPN to obtain a replaced address of the new page, and generating a page jumping request based on the replaced address of the new page;

sending the page jumping request to the first browser;

receiving an access request sent by the first browser in response to the page jumping request;

replacing the proxy domain name in the access request sent by the first browser with the domain name of the source station; and acquiring, using the second browser, the resources from the source station directed to by the domain name of the source station.

4. The resource acquisition method according to claim 3, wherein replacing the domain name of the source station in the address of the new page with the proxy domain name directing to the server for the WebVPN comprises:

assigning the proxy domain name corresponding to the server for the Web VPN to the domain name of the source station in the address of the new page, and recording a mapping relationship between the domain name of the source station and the proxy domain name; and replacing the domain name of the source station in the address of the new page with the proxy domain name;

wherein replacing the proxy domain name in the access request sent by the first browser with the domain name of the source station comprises:

replacing, according to the mapping relationship, the proxy domain name in the access request sent by the first browser with the domain name of the source station.

5. The resource acquisition method according to claim 4, wherein during recording the mapping relationship between the domain name of the source station and the proxy domain name, a validity duration is set for the mapping relationship; and in response to expiration of the validity duration, the mapping relationship is marked as invalid or is deleted.

6. The resource acquisition method according to claim 5, wherein before replacing, according to the mapping relationship, the proxy domain name in the access request sent by the first browser with the domain name of the source station, the method further comprises:

verifying validity of the access request sent by the first browser based on the mapping relationship and the validity duration;

in response to the mapping relationship corresponding to the proxy domain name existing and being valid, determining that the access request sent by the first browser is valid; or in response to the mapping relationship corresponding to the proxy domain name not existing or being invalid, determining that the access request sent by the first browser is invalid, and refusing the access request sent by the first browser.

7. A proxy server for a WebVPN, wherein a proxy service and a second browser run on the proxy server, and the proxy service is configured to acquire resources from a source station and feed back the resources to a client based on a resource acquisition method, wherein the method comprises:

receiving a user input event from a first browser on the client;

acquiring an event result triggered at the second browser by the user input event, wherein the second browser runs on the proxy server for the WebVPN;

acquiring, using the second browser, the resources from the source station according to the event result, and taking a screenshot of an image of a web page presented at the second browser as a view of the web page after loading and rendering of the resources at the second browser; and feeding back the resources to the client based on the view of the web page, to present the resources at the first browser.

8. The proxy server according to claim 7, wherein feeding back the resources to the client based on the view of the web page, comprises:

generating HTML text according to the view of the web page, and adding a monitoring script configured to monitor the user input event to the HTML text; and feeding back the HTML text to the client, to present the HTML text and run the monitoring script at the first browser.

9. The proxy server according to claim 7, wherein acquiring, using the second browser, the resources from the source station according to the event result comprises:

in response to the event result being page jumping, acquiring an address of a new page to be accessed from an access request sent by the second browser to the new page, replacing a domain name of the source station in the address of the new page with a proxy domain name directing to the proxy server for the Web VPN to obtain a replaced address of the new page, and generating a page jumping request based on the replaced address of the new page;

sending the page jumping request to the first browser;

receiving an access request sent by the first browser in response to the page jumping request;

replacing the proxy domain name in the access request sent by the first browser with the domain name of the source station; and acquiring, using the second browser, the resources from the source station directed to by the domain name of the source station.

10. The proxy server according to claim 9, wherein replacing the domain name of the source station in the address of the new page with the proxy domain name directing to the proxy server for the Web VPN comprises:

assigning the proxy domain name corresponding to the proxy server for the Web VPN to the domain name of the source station in the address of the new page, and recording a mapping relationship between the domain name of the source station and the proxy domain name; and replacing the domain name of the source station in the address of the new page with the proxy domain name;

wherein replacing the proxy domain name in the access request sent by the first browser with the domain name of the source station comprises:

replacing, according to the mapping relationship, the proxy domain name in the access request sent by the first browser with the domain name of the source station.

11. The proxy server according to claim 10, wherein during recording the mapping relationship between the domain name of the source station and the proxy domain name, a validity duration is set for the mapping relationship; and in response to expiration of the validity duration, the mapping relationship is marked as invalid or is deleted.

12. The proxy server according to claim 11, wherein before replacing, according to the mapping relationship, the proxy domain name in the access request sent by the first browser with the domain name of the source station, the method further comprises:
- verifying validity of the access request sent by the first browser based on the mapping relationship and the validity duration;
- in response to the mapping relationship corresponding to the proxy domain name existing and being valid, determining that the access request sent by the first browser is valid; or
- in response to the mapping relationship corresponding to the proxy domain name not existing or being invalid, determining that the access request sent by the first browser is invalid, and refusing the access request sent by the first browser.

13. A server, comprising:
- at least one processor; and
- a memory being in communication connection with the at least one processor;
- wherein the memory is configured to store instructions, which, when executed by the at least one processor, causes the at least one processor to implement operations of a resource acquisition method, wherein the method comprises:
  - receiving a user input event from a first browser on a client;
  - acquiring an event result triggered at a second browser by the user input event, wherein the second browser runs on the server for a Web VPN;
  - acquiring, using the second browser, resources from a source station according to the event result, and taking a screenshot of an image of a web page presented at the second browser as a view of the web page after loading and rendering of the resources at the second browser; and
  - feeding back the resources to the client based on the view of the web page, to present the resources at the first browser.

14. The server according to claim 13, wherein feeding back the resources to the client based on the view of the web page, comprises:
- generating HTML text according to the view of the web page, and adding a monitoring script configured to monitor the user input event to the HTML text; and
- feeding back the HTML text to the client, to present the HTML text and run the monitoring script at the first browser.

15. The server according to claim 13, wherein acquiring, using the second browser, the resources from the source station according to the event result comprises:
- in response to the event result being page jumping, acquiring an address of a new page to be accessed from an access request sent by the second browser to the new page, replacing a domain name of the source station in the address of the new page with a proxy domain name directing to the server for the WebVPN to obtain a replaced address of the new page, and generating a page jumping request based on the replaced address of the new page;
- sending the page jumping request to the first browser;
- receiving an access request sent by the first browser in response to the page jumping request;
- replacing the proxy domain name in the access request sent by the first browser with the domain name of the source station; and
- acquiring, using the second browser, the resources from the source station directed to by the domain name of the source station.

16. The server according to claim 15, wherein replacing the domain name of the source station in the address of the new page with the proxy domain name directing to the server for the WebVPN comprises:
- assigning the proxy domain name corresponding to the server for the Web VPN to the domain name of the source station in the address of the new page, and recording a mapping relationship between the domain name of the source station and the proxy domain name; and
- replacing the domain name of the source station in the address of the new page with the proxy domain name;
- wherein replacing the proxy domain name in the access request sent by the first browser with the domain name of the source station comprises:
- replacing, according to the mapping relationship, the proxy domain name in the access request sent by the first browser with the domain name of the source station.

17. The server according to claim 16, wherein during recording the mapping relationship between the domain name of the source station and the proxy domain name, a validity duration is set for the mapping relationship; and
- in response to expiration of the validity duration, the mapping relationship is marked as invalid or is deleted.

* * * * *